March 2, 1926.                                                1,575,478
F. EARLE
METHOD OF PRODUCING COMPOSITE MOTION PICTURES
Filed June 3, 1925

INVENTOR.
Ferdinand Earle
BY
ATTORNEYS.

Patented Mar. 2, 1926.

1,575,478

UNITED STATES PATENT OFFICE.

FERDINAND EARLE, OF LOS ANGELES, CALIFORNIA.

METHOD OF PRODUCING COMPOSITE MOTION PICTURES.

Application filed June 3, 1925. Serial No. 34,553.

*To all whom it may concern:*

Be it known that I, FERDINAND EARLE, a native citizen of the United States, and resident of Los Angeles, in the county of Los Angeles, State of California, have invented new and useful Improvements in Methods of Producing Composite Motion Pictures, of which the following is a specification.

This invention relates to photographing objects before large backgrounds having scenic effects delineated thereon, and is especially useful in motion picture production. The present invention appertains more particularly to the art of picture composition, whereby a composite picture may be created by photographing real objects before an artificial background, the latter being delineated upon a surface such as canvas or the like so as to produce suitable scenic, atmospheric, or imaginary effects.

Heretofore, the static background has been delineated by photographing, drawing, or painting the desired components upon a suitable flat surface to produce graduated lights and shades for the proper effect. It has been necessary to comparatively accentuate the high lights and dark shades by intensifying the contrasts of the negative by resort to full development, thereby tending to harshness. As the intensity of illumination required for motion picture photography is relatively great, high candle power lights to illuminate the objects have been necessary. In order to avoid harmful reflections and halations, all glossy or shiny surfaces on the background have been painstakingly avoided. However, the effect of the depth and the best gradation of shades on a back drop are obtained by the use of backdrops having highly glossy surfaces, which greatly increase the intensity of the dark colors.

The primary object of this invention is to provide a method of creating pictures of the character described, wherein objects may be photographed before a background or backdrop having a scene delineated upon a flat surface, the whole being shiny or glossy. To this end I illuminate such a background by the means of light screened from the camera and other objects or actors in front of the background and whose rays impinge upon the background at an unusually shallow angle.

Figure 1:
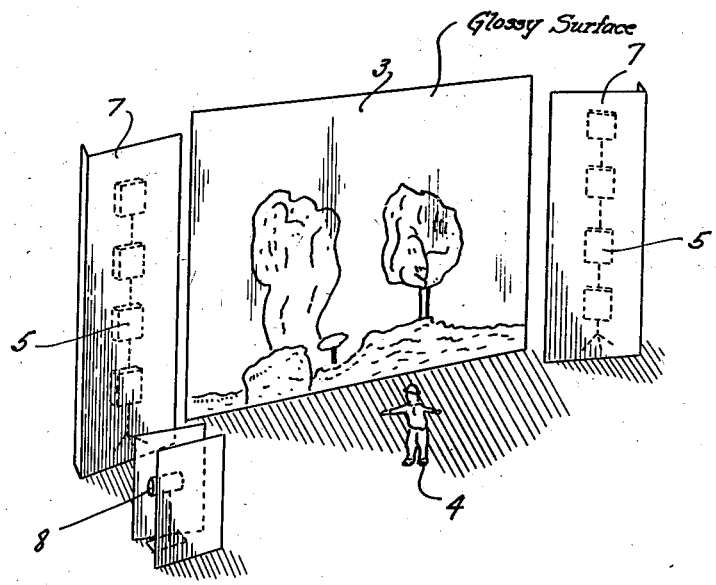
Figure 2:
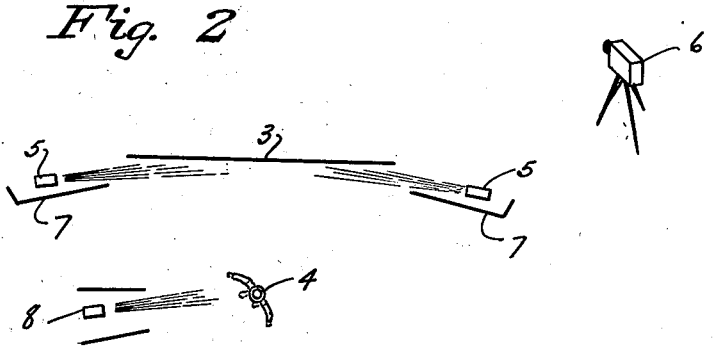

In the drawing, Fig. 1 is a perspective view illustrating the essentials for photographing action before a background in accordance with my method; and Fig. 2 is a diagrammatic plan view thereof.

Referring more particularly to the drawing, 3 designates a background, which may be a large drawing, a painting, an enlargement of a photograph, or any other delineation of such size that the action may take place in front of it. It has a very smooth flat and shiny surface such as a highly varnished surface, and in some instances I have found it desirable to increase the smoothness and glossiness by coating the surface with a film of heavy liquid oil, such as a paraffine oil. An actor in the dark, or illumined by a separate system of shielded lights that do not shine into its glossy surface may pose in front of the background, and the whole photographed together. It is obvious that this is merely illustrative, as several actors may pose in front of the background. If desired fragmentary objects, such as shrubbery, hangings, miniatures, glass paintings, fragments of sets, windows, etc., may be placed in front of the background and the whole photographed with a single or subsequent exposure or exposures of a motion picture film in a darkened room or so arranged as to avoid reflections. The background is illuminated by lamps disposed at the borders. For clarity, I have shown lamps 5 at the sides screened from the camera 6 by shields 7. The lamps 5 are placed in such positions that the rays therefrom impinge on the background at a very shallow angle so that rays to which the camera film is sensitive will not be directly reflected into the camera lens. The actor may be illuminated by suitable lamps, or sunlight or screened or reflected sunlight. A lamp for this purpose is indicated by 8. The illumination of the actor should be produced by sunlight or by a lamp projecting rays upon the actor but masked from projecting its reflections from the background to the camera and at an angle such that there will be no direct reflection of light from the shields or lamps to the camera or from the background.

Due to the angle of illumination of the background, at least twice the amount of light is required for artistic purposes as now used for the backgrounds employed. The entire illumination of the background is similar to indirect lighting. Thus, the glossy surface background which has always been avoided because of the host of difficulties, evils, delays, limitations and added costs caused by the reflection is compensated for in added beauty and perfection of photography.

What I claim is:

1. A process of photographing motion pictures which consists in posing objects or actors in front of a background comprising a glossy surface having objects delineated thereon, illuminating said surface by light at an extremely shallow angle, and photographing the composite scene.

2. A process of photographing motion pictures which consists in posing objects or actors in front of a background comprising a glossy surface having objects delineated thereon, illuminating said objects or actors, independently illuminating said surface by light at an extremely shallow angle, and photographing the composite scene.

3. A process of photographing motion pictures which consists in posing natural objects or actors in front of a background comprising a glossy surface having objects delineated thereon, illuminating said surface by shallow lighting, illuminating the natural object or actor or actors by a source of light at an angle such that the rays therefrom will not be directly reflected from said background into the camera lens, and photographing the composite scene.

4. A process of photographing motion pictures, which consists in posing natural objects or actors in front of a large background comprising a glossy surface having objects delineated thereon, illuminating said back-ground by sources of light disposed at an edge thereof so that the rays impinge on said surface at an acute angle, masking said sources of light from the front, and photographing the composite scene.

5. A process of photographing motion pictures, which consists in posing natural objects or actors in front of a background comprising a glossy surface having objects delineated thereon, illuminating said background by sources of light disposed at the edges thereof so that the rays impinge on said surface at acute angles, masking said sources of light from the camera, independently illuminating the natural objects by a source of light so placed that the rays therefrom cannot be directly reflected from said background to the camera lens, and photographing the composite scene.

In witness that I claim the foregoing I have hereunto subscribed my name this 29th day of May, 1925.

FERDINAND EARLE.